May 19, 1964  G. C. RAYL  3,133,394
MACHINE FOR REMOVING THE LIDS FROM BAKING PANS
Filed Dec. 5, 1960  2 Sheets-Sheet 1

INVENTOR
George C. Rayl

BY

ATTORNEY

May 19, 1964        G. C. RAYL        3,133,394

MACHINE FOR REMOVING THE LIDS FROM BAKING PANS

Filed Dec. 5, 1960        2 Sheets-Sheet 2

INVENTOR
George C. Rayl

BY

ATTORNEY

United States Patent Office 3,133,394
Patented May 19, 1964

3,133,394
MACHINE FOR REMOVING THE LIDS FROM BAKING PANS
George C. Rayl, Chickasha, Okla.
Filed Dec. 5, 1960, Ser. No. 73,773
1 Claim. (Cl. 53—381)

The invention relates to machines for delidding or removing the lids from baking pans as the pans are conveyed with the baked product therein from the oven.

An object is to provide a simple machine for the purpose, readily maintained and operated, and inexpensive to build, so that it is available to more users. Other objects and advantages will appear hereinafter or will be obvious.

The invention consists in the novel construction and combination of parts, as hereinafter set forth in the claims.

Figure 1:
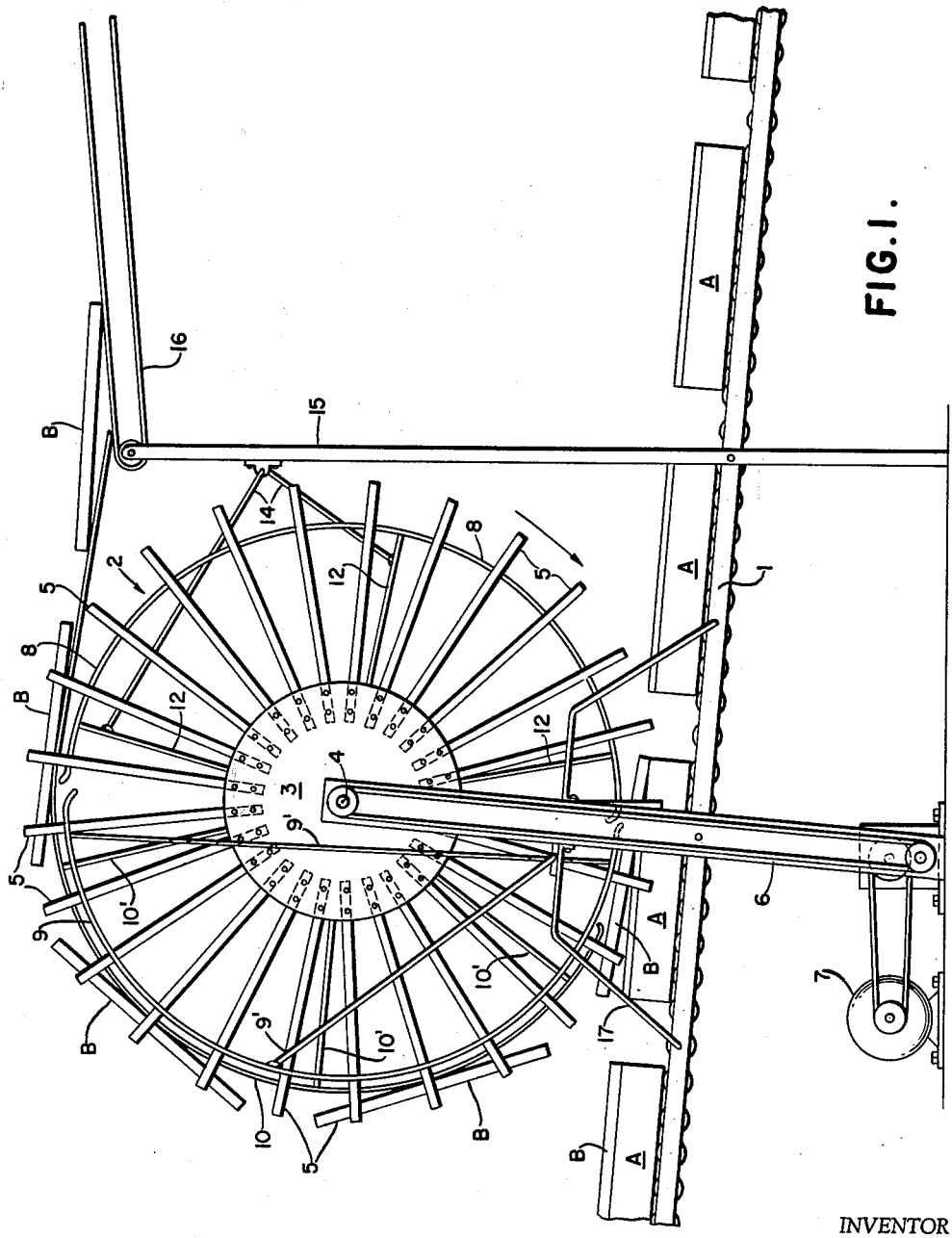
Figure 2:
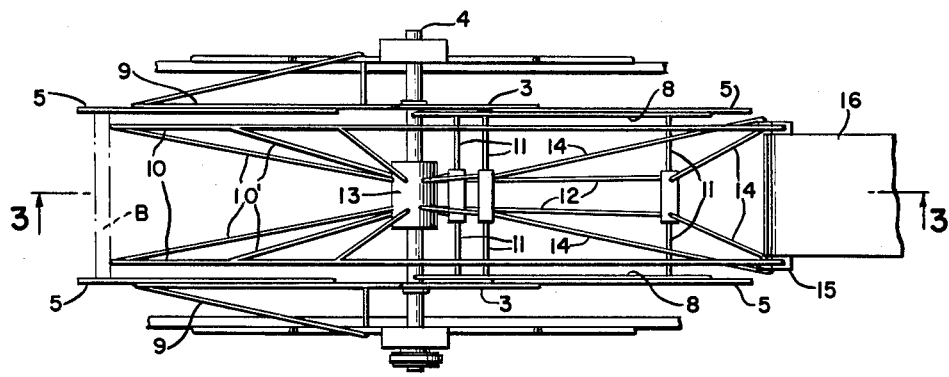
Figure 3:
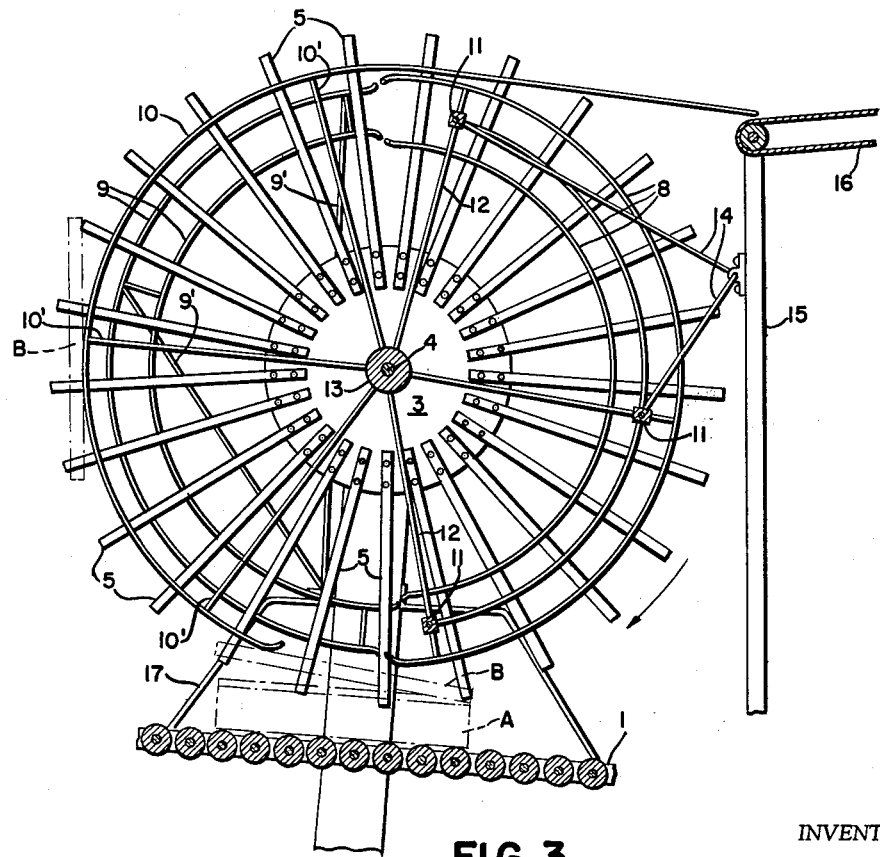

In the accompanying drawings,
FIGURE 1 is a side view of the invention as applied.
FIGURE 2 is a plan view of the same.
FIGURE 3 is a section on the line 3—3 of FIGURE 2.

Referring to the drawings, 1 designates a conveyor belt for the pans A, and 2 a rotatable wheel, mounted above the belt and comprising laterally spaced disk hubs 3, fast on the shaft 4 of said wheel and a radial circumferential series of resilient steel fingers 5 at each side thereof, the inner ends of said fingers being secured to said disk hubs, said shaft being rotated by a belt 6 driven by a motor 7, thereby rotating said wheel.

Located between the outer ends of the opposite series of said fingers concentrically of said wheel are arcuate spreader rods 8 having respectively a length of about 180 degrees and adapted to spread the fingers of the opposite series apart against their resiliency, said rods 8 being held stationary with respect to said wheel by means to be described. During the rotation of said wheel, said fingers escape from the lower ends of said spreader rods 8 and simultaneously by their resiliency grasp the lids of successive pans carried by said belt 1, at the bottom of the wheel, carry said lids B upwardly away from the pans around the wheel, and discharge the lids upside down tangentially of the wheel. Said discharge as shown takes place at the top of the wheel but is capable of taking place at any circumferential point on the wheel above its bottom, depending upon where said lids are to be conveyed after such discharge and whether upside down or top side up, and involving suitable modifications of the arcuate spreader rods, guide rods and inside safety rods as to their lengths and placement.

During the time said lids are being carried upwardly around the wheel by said fingers to the top of the wheel, said fingers are held in lid grasping position against premature release between arcuate guide rods 9 and arcuate inside safety rods 10, held stationary with respect to said wheel by means to be described and having respectively a length of about 180 degrees and being located diametrically opposite the spreader rods 8.

During the rotation of said wheel, said fingers emerge from the upper ends of said rods 9 and 10 and are simultaneously reengaged with the spreader rods 8 against their resiliency, thereby releasing said fingers from and discharging said lids tangentially of the wheel.

The opposite arcuate spreader rods 8 and the opposite arcuate guide rods and inside safety rods 9 and 10 are supported by and held stationary with respect to said wheel 2 by any suitable means. As shown the spreader rods 8 have transverse brace connections 11 with support rods 12 carried by the hub 13 located between the disk hubs 3 and loose on the shaft 4 of said wheel. The spreader support rods 12 have brace connections 14 with the leg support 15 of the conveyor 16 upon which said lids are discharged tangentially of said wheel. The inside safety rods 10 are carried by support rods 10' connected at their inner ends to said hub 13. The guide rods 9 have connections 9' with the fixed frame 17. Any suitable means, such as threaded bolts, winged nuts, etc., not shown, may be provided for making and maintaining proper adjustment of the opposite arcuate spreader rods, guide rods and inside safety rods.

The right is reserved to modifications coming within the scope of the claims.

I claim:
1. In a machine for removing the lids from baking pans, a conveyor belt for the pans, and means comprising a rotatable wheel mounted above the belt upon a unitary shaft and having at each side thereof a radial circumferential series of slender strap-like resilient fingers spaced apart by distances much greater than their breadth and increasing outwardly for grasping the lids of successive fed pans, carrying them away from the pans around the wheel and releasing and discharging them tangentially of the wheel during its rotation, said lid carrying means also comprising stationary arcuate members for spreading the fingers of the opposite series apart against their resiliency, and for releasing them to effect said grasping by their resiliency, said means also comprising stationary arcuate members for holding said fingers in lid grasping position against premature release.

References Cited in the file of this patent
UNITED STATES PATENTS

| | | |
|---|---|---|
| 2,584,925 | Rideout | Feb. 5, 1952 |
| 2,675,953 | Van Poolen | Apr. 20, 1954 |
| 2,778,180 | Eyster | Jan. 22, 1957 |
| 2,932,928 | Pulver | Apr. 19, 1960 |
| 2,975,574 | Jorgenson et al. | Mar. 21, 1961 |
| 3,071,911 | Heide | Jan. 8, 1963 |